(12) United States Patent
Song et al.

(10) Patent No.: US 8,179,865 B2
(45) Date of Patent: May 15, 2012

(54) METHOD AND APPARATUS FOR CANCELLING OTHER CELL INTERFERENCE IN A WIRELESS COMMUNICATION SYSTEM

(75) Inventors: Seong-Wook Song, Gwacheon-si (KR); Hun-Kee Kim, Seoul (KR); Sung-Soo Kim, Seoul (KR)

(73) Assignee: Qualcomm Incorporated, San Diego, CA (US)

( * ) Notice: Subject to any disclaimer, the term of this patent is extended or adjusted under 35 U.S.C. 154(b) by 880 days.

(21) Appl. No.: 11/702,442

(22) Filed: Feb. 5, 2007

(65) Prior Publication Data

US 2007/0211672 A1  Sep. 13, 2007

(30) Foreign Application Priority Data

Feb. 3, 2006 (KR) .................. 10-2006-0010387

(51) Int. Cl.
*H04B 7/216* (2006.01)
(52) U.S. Cl. ........ 370/335; 370/341; 370/342; 370/441; 370/447
(58) Field of Classification Search .................. 370/390, 370/535, 329, 480, 302, 332, 340, 335, 330, 370/441, 478, 479, 208, 319–322, 341–344, 370/348, 436, 437, 443, 468; 375/340, 256; 455/456.5, 439, 443–455, 456.3, 464, 561, 455/506, 62, 63.1, 114.2, 166.2, 179.1, 278.1
See application file for complete search history.

(56) References Cited

U.S. PATENT DOCUMENTS

| 6,504,832 | B1 * | 1/2003 | Koo et al. ...................... 370/342 |
| 6,973,063 | B1 * | 12/2005 | Sourour ........................ 370/335 |
| 7,016,319 | B2 * | 3/2006 | Baum et al. .................... 370/329 |
| 7,020,110 | B2 * | 3/2006 | Walton et al. ................. 370/334 |
| 7,257,406 | B2 * | 8/2007 | Ji ................................. 455/450 |
| 2002/0003782 | A1 * | 1/2002 | Pan et al. ...................... 370/280 |
| 2003/0021271 | A1 * | 1/2003 | Leimer et al. ................. 370/535 |
| 2003/0133520 | A1 * | 7/2003 | Jayaraman et al. ........... 375/340 |
| 2004/0081123 | A1 * | 4/2004 | Krishnan et al. .............. 370/329 |
| 2004/0081131 | A1 * | 4/2004 | Walton et al. ................. 370/344 |
| 2004/0085892 | A1 * | 5/2004 | Walton et al. ................. 370/208 |
| 2004/0184398 | A1 * | 9/2004 | Walton et al. ................. 370/203 |
| 2005/0096061 | A1 | 5/2005 | Ji et al. |
| 2006/0215603 | A1 * | 9/2006 | Nishio et al. .................. 370/329 |

FOREIGN PATENT DOCUMENTS

| KR | 1020040076438 | 9/2004 |
| KR | 1020050019293 | 3/2005 |
| KR | 1020050048261 | 5/2005 |
| KR | 1020050089711 | 9/2005 |
| KR | 1020050091612 | 9/2005 |
| KR | 1020050115077 | 12/2005 |
| WO | WO 2005/043948 | 5/2005 |

* cited by examiner

*Primary Examiner* — Kent Chang
*Assistant Examiner* — San Htun
(74) *Attorney, Agent, or Firm* — Elaine Lo

(57) ABSTRACT

A method and apparatus for reducing other cell interference in a wireless communication system are provided, in which a symbol generator for generating at least one modulation symbols to be transmitted, a resource mapper for mapping and assigning the modulation symbols into a resource block common to a Base Station (BS) and at least one neighboring Base Station (BS), and a spreader for spreading the mapped modulation symbol with an BS-specific code allocated to the BS, the BS-specific codes of the BS being one of orthogonal and quasi-orthogonal to an BS-specific code allocated to the neighbor BS.

22 Claims, 9 Drawing Sheets

|  | t = 0 | Ts |
|---|---|---|
| k = 0 | oc(0)s(0) | |
| | oc(1)s(0) | |
| | oc(2)s(0) | |
| | oc(3)s(0) | |
| | oc(4)s(0) | |
| | oc(5)s(0) | |
| R | oc(0)s(1) | |
| | oc(1)s(1) | |
| | oc(2)s(1) | |
| | oc(3)s(1) | |
| | oc(4)s(1) | |
| | oc(5)s(1) | |
| 2R | | |
| | | |
| | | |
| | | |
| | | |
| | | |

CDMA SLOT OF LENGTH R

FIG.5

| | t = 0 | Ts | 2 Ts | 3 Ts | 4 Ts | 5 Ts |
|---|---|---|---|---|---|---|
| k = 0 | oc(0)s(0) | oc(1)s(0) | oc(2)s(0) | oc(3)s(0) | oc(4)s(0) | oc(5)s(0) |
| 1 | oc(0)s(1) | oc(1)s(1) | oc(2)s(1) | oc(3)s(1) | oc(4)s(1) | oc(5)s(1) |
| 2 | oc(0)s(2) | oc(1)s(2) | oc(2)s(2) | oc(3)s(2) | oc(4)s(2) | oc(5)s(2) |
| 3 | | | | | | |
| 4 | | | | | | |
| 5 | | | | | | |

CDMA SLOT OF LENGTH R

FIG.6

METHOD AND APPARATUS FOR CANCELLING OTHER CELL INTERFERENCE IN A WIRELESS COMMUNICATION SYSTEM

PRIORITY

This application claims priority under 35 U.S.C. §119(a) to a Korean Patent Application filed in the Korean Intellectual Property Office on Feb. 3, 2006 and assigned Serial No. 2006-10387, the entire disclosure of which is incorporated herein by reference.

BACKGROUND OF THE INVENTION

1. Field of the Invention

The present invention generally relates to an wireless communications system. More particularly, the present invention relates to a method and apparatus for reducing other cell interference by using a Base Station (BS)-specific orthogonal code or quasi-orthogonal code.

2. Description of the Related Art

Beginning with analog cellular service called 1$^{st}$ Generation (1G), mobile communication systems are evolving toward 4$^{th}$ Generation (4G) that provides ultra high-speed multimedia service beyond 2$^{nd}$ Generation (2G) digital technology and 3$^{rd}$ Generation (3G) providing high-speed multimedia service in International Mobile Telecommunications-2000 (IMT-2000). The 4G mobile communication system is designed to support higher data rates, aiming at data transmission at or above 100 MBps. Under a multipath radio channel environment, the 4G mobile communication system compensates for multipath fading and ensures transmission of burst packet data that has rapidly increased in amount along with provisioning of packet service.

OFDMA is a promising candidate for radio access technology satisfying 4G mobile communication requirements. OFDMA is a special case of MultiCarrier Modulation (MCM) in which input data is converted to as many parallel data sequences as subcarriers are used and the input data is modulated in the subcarriers, prior to transmission.

Since the number of subcarriers changes according to a user-requested data rate, OFDMA enables efficient resource distribution and increases transmission efficiency. Due to its feasibility for multiple subcarriers (i.e. a large Fast Fourier Transform (FFT) size), OFDMA is efficient for a wireless communication system having cells with a relatively long time delay spread.

FIG. 1 is a block diagram of a typical OFDMA transmission structure. In the illustrated case of FIG. 1, transmitters 100, 120 and 140 are provided in a plurality of BSs controlling their respective cells, BS0, BS1 and BS2.

Referring to FIG. 1, Forward Error Correction (FEC) encoders 102, 122 and 142 encode information sequences as source data to be transmitted from their BSs, i.e. BS0, BS1 and BS2. Symbol mappers 104, 124 and 144 modulate the coded data in Quadrature Phase Shift Keying (QPSK)/16-ary Quadrature Amplitude Modulation (16QAM)/64-ary QAM (64QAM), thus producing modulation symbols $s_0(k)$, $s_1(k)$ and $s_2(k)$. Repeaters 106, 126, and 146 repeat the modulation symbols $s_0(k)$, $s_1(k)$ and $s_2(k)$ according to repetition numbers set in their BSs (BS0, BS1 and BS2) and allocate the repeated symbols to a plurality of subcarriers.

Scramblers 108, 128 and 148 scramble the signal sequences $S_{R,0}(k)$, $S_{R,1}(k)$ and $S_{R,2}(k)$ allocated to the subcarriers with BS-specific scrambling sequences $sc_0(k)$, $sc_1(k)$ and $sc_2(k)$. Inverse Fast Fourier Transform (IFFT) processors 110, 130 and 150 convert the scrambled signals to time-domain signals. The time-domain signals are sent to users within the cell areas of BS0, BS1 and BS2 via antennas 112, 132 and 152.

The operation of transmitters 100, 120 and 140 is formulated as follows.

The outputs of symbol mappers 104, 124 and 144 are given as Equation (1), $$s(m), m=0, \ldots, M-1 \quad (1)$$

where m denotes a bit index and M denotes the length of a modulation symbol, i.e. the number of bits per modulation symbol.

Repeaters 106, 126 and 146 repeat s(m) R times as expressed by Equation (2). Thus, $$s_R(k)=s(k \bmod M), k=0, \ldots, N-1 \quad (2)$$

where k denotes a subcarrier index and mod represents a modulo operation. N is the total length of a symbol which is repeated R times as expressed by Equation (3). Therefore, $$N=RM \quad (3)$$

Let a scrambling sequence with 1s or −1s be denoted by sc(k). Then, the outputs of the scramblers 108, 128 and 148 are expressed as Equation (4), $$x(k)=sc(k)s_R(k), k=0, \ldots, N-1 \quad (4)$$

A receiver of a Mobile Terminal (MT) receives interference signals from neighbor cells, i.e. neighbor cell interference signals as well as a signal from a serving BS. If BS0 is a serving cell and BS1 is a neighbor cell in FIG. 1, the received signal y(k) includes noise n(k), expressed as Equation (5), $$y(k)=h_0(k)x_0(k)+h_1(k)x_1(k)+n(k) \quad (5)$$

where $x_0(k)$ and $x_1(k)$ denote signals transmitted from BS0 and BS1, $h_0(k)$ denotes a channel frequency response representing a k$^{th}$ subchannel between BS0 and the MT, and $h_1(k)$ denotes a channel frequency response between BS1 and the MT.

FIG. 2 is a block diagram of a typical OFDMA receiver.

Referring to FIG. 2, an FFT processor 202 converts a time-domain signal y(k) received through an antenna 200 to a frequency-domain signal by FFT and a descrambler 204 descrambles the FFT signals as modeled by Equation (6), $$z_p(k)=sc_0(k)y(k) \quad (6)$$

where $sc_0(k)$ denotes a scrambling sequence allocated to the serving cell (e.g. BS0). A channel compensator 208 compensates the descrambled signal using a channel frequency response estimated by a channel estimator 206 as expressed by Equation (7).

$$z_R(k)=z_p(k)=sc_0(k)y(k)/h_0(k) \quad (7)$$

where $h_0(k)$ denotes the channel frequency response estimated for the serving cell BS0.

A combiner 210 accumulates the channel-compensated signal as many times as the repetition number R of the repeater 106 as given by Equation (8).

$$z(m) = \frac{1}{R}\sum_{r=0}^{R-1} z_R(r+mR) \quad (8)$$

$$= \frac{1}{R}\sum_{r=0}^{R-1} s_{R,0}(r+mR) + \frac{1}{R}\sum_{r=0}^{R-1} i(r+mR)$$

$$i(k) = sc_0(k)(h_1(k)x_1(k)+n(k))/h_0(k)$$

where $S_{R,0}(k)$ denotes a repeated transmission signal from BS0 and I(k) denotes a noise and interference signal.

Considering $s_{R,0}(0+mR)=s_{R,0}(1+mR)=\ldots=s_{R,0}(R-1+mR)$, then z (m) is given by Equation (9) as, $$z(m) = s_0(m) + \frac{1}{R}\sum_{r=0}^{R-1} i(m + Mr) \qquad (9)$$

where $s_0(m)$ denotes a modulation symbol from BS0. Assuming that the noise and interference signal is Additive White Gaussian Noise (AWGN), an averaging effect reduces the noise and interference signal, thus improving the reception performance of the MT.

Wireless Broadband (WiBro), which is an Institute of Electrical and Electronics Engineers (IEEE) 802.16-based OFDMA system, basically uses a frequency reuse factor of 1. With the frequency reuse factor of 1, the WiBro system is advantageous in terms of frequency efficiency but suffers from interference between BSs because all subcarriers used in one BS are overlapped with those of neighbor BSs. The neighbor BS interference signals degrade the reception performance of an MT at a cell boundary and often interrupt communications during handover.

FIG. 3 illustrates a typical MT located in an overlap region among three cells. Three BSs 312, 314 and 316 cover cell areas 302, 304 and 306, respectively and an MT 310 is located equidistantly from BSs 312, 314 and 316. In the case where the MT is located at any place within the overlap area as well as at the equidistant area, signals from BSs other than a serving BS selected by MT 310 interfere with a signal from the serving BS. To avert the interference problem at the cell boundary, the IEEE 802.16 standards provide that a low modulation order like QPSK, a low FEC coding rate, and a repetition number of up to 6 are used for a transmission signal from a BS. Despite these efforts, an existing MT receiver has a high outage probability in the vicinity of the cell boundary and experiences degradation of handover performance on a fading channel. To fundamentally solve this problem, the frequency reuse factor should be at least 3, but at the expense of decreasing frequency efficiency to ⅓ and cell planning complexity.

SUMMARY OF THE INVENTION

An aspect of the present invention is to address at least the above problems and/or disadvantages and to provide at least the advantages described below. Accordingly, an aspect of the present invention is to provide a method and apparatus for preventing the degradation of the reception performance of an MT at a cell boundary, caused by neighboring cell interference signals in an OFDMA system.

Moreover, the present invention provides a method and apparatus for canceling neighboring cell interference at a receiver, in which BS-specific orthogonal codes or quasi-orthogonal codes of length R are appropriated to BSs, defining a Code Division Multiple Access (CDMA) slot by subcarriers allocated according to a repetition number R in an OFDMA system.

In accordance with an aspect of the present invention, there is provided a transmission method for reducing other cell interference in a wireless communication system, in which at least one modulation symbol to be transmitted is generated and the modulation symbol is mapped and assigned into a resource block common to a BS and at least one neighboring BS, and the mapped modulation symbol is spread with a BS-specific code allocated to the BS, the BS-specific codes of the BS being one of orthogonal and quasi-orthogonal to a BS-specific code allocated to the neighboring BS.

In accordance with another aspect of the present invention, there is provided a transmitter for reducing other cell interference in a wireless communication system, in which a symbol generator for generating at least one modulation symbols to be transmitted, a resource mapper for mapping and assigning the modulation symbols into a resource block common to a Base Station (BS) and at least one neighboring Base Station (BS), and a spreader for spreading the mapped modulation symbol with an BS-specific code allocated to the BS, the BS-specific codes of the BS being one of orthogonal and quasi-orthogonal to an BS-specific code allocated to the neighbor BS.

In accordance with the other aspect of the present invention, there is provided a receiving method for reducing other cell interference in a wireless communication system, in which a spread data is received through a resource block common to a Base Station (BS) and at least one neighboring Base Station (BS), the spread data is despreaded with an BS-specific code allocated to the BS and outputting at least one modulation symbol, the BS-specific codes of the BS being one of orthogonal and quasi-orthogonal to an BS-specific code allocated to the neighbor BS, and the modulated symbol is decoded.

BRIEF DESCRIPTION OF THE DRAWINGS

The above and other objects, features and advantages of the present invention will be more apparent from the following detailed description taken in conjunction with the accompanying drawings, in which:

FIG. 5 illustrates symbol repetition and code allocation on a frequency domain according to the present invention;

FIG. 6 illustrates symbol repetition and code allocation on a time domain according to the present invention;

DETAILED DESCRIPTION OF PREFERRED EMBODIMENTS

The matters defined in the description such as a detailed construction and elements are provided to assist in a comprehensive understanding of the preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a technique for preventing the reception performance of an MT at a cell boundary from being degraded due to neighboring cell interference signals in an OFDMA system such as WiBro, in which an OFDMA frame is divided into CDMA slots each having a time-frequency resource block of a predetermined size, and a plurality of BSs use orthogonal codes or less correlated codes (hereinafter, quasi-orthogonal codes) in each CDMA slot, that is, the BSs spread information symbols with BS-specific orthogonal codes rather than scramble the information symbols with scrambling sequences.

Figure 4:
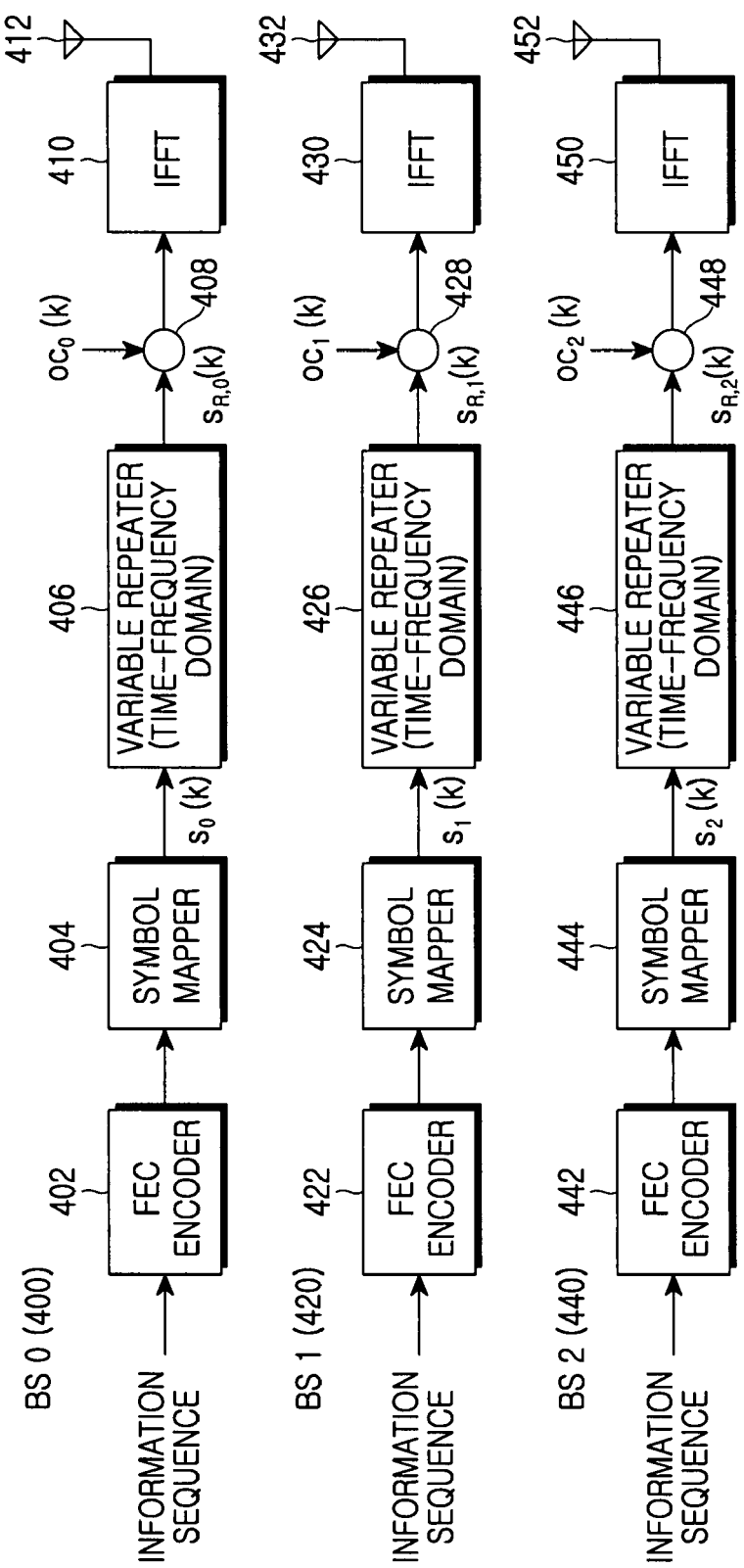
FIG. 4 is a block diagram of an OFDMA transmission structure according to the present invention.

Referring to FIG. 4, transmitters 400, 420 and 440 are provided in a plurality of BSs i.e. BS0, BS1 and BS2 that control their own cells. FEC encoders 402, 422 and 442 encode information sequences as source data to be transmitted from their BSs i.e. BS0, BS1 and BS2. Symbol mappers 404, 424 and 444 modulate the coded data in QPSK/16QAM/64QAM, thus producing modulation symbols $s_0(k)$, $s_1(k)$ and $s_2(k)$. Variable repeaters 406, 426, and 446 operated as resource mappers, repeat the modulation symbols $s_0(k)$, $s_1(k)$ and $s_2(k)$ according to repetition numbers R set in their BSs (BS0, BS1 and BS2) and allocate the repeated symbols to a plurality of subcarriers.

R is variably set under the control of a higher-layer system. The repetition of the modulation symbols may occur in the time domain and/or the frequency domain. The frequency-domain repetition amounts to mapping the same modulation symbol to R subcarriers, and the time-domain repetition amounts to R occurrences of the same modulation symbol in R time intervals.

Spreaders 408, 428 and 448 spread the signal sequences $S_{R,0}(k)$, $S_{R,1}(k)$ and $S_{R,2}(k)$ allocated to the subcarriers with BS-specific orthogonal codes $oc_0(k)$, $oc_1(k)$ and $oc_2(k)$. The orthogonal codes are of a length equal to the repetition number R, under control of the variable repeaters 406, 426 and 446. IFFT processors 410, 430 and 450 convert the spread signals to time-domain signals. The IFFT signals are sent to users within the cell areas of BS0, BS1 and BS2 via antennas 412, 432 and 452.

In a BS transmitter having the above configuration, information symbols occur R times in a CDMA slot of a length equal to the repetition number R. Neighbor BSs have the same CDMA slot structure at least and neighboring cell interference with an MT is minimized by use of spreading codes (i.e. orthogonal codes or quasi-orthogonal codes) of the same length as that of the CDMA slot. Preferred embodiments of the CDMA slot are illustrated in FIGS. 5 and 6.

Referring to FIG. 5, the horizontal axis represents the time domain and the vertical axis represents the frequency domain. For R=6, information symbols s(0) and s(1) occur six times on the frequency domain as they are multiplied by a spreading code of length 6 oc(r)={oc(0), oc(1), oc(2), oc(3), oc(4), oc(5)} in a time interval t=0 (period=Ts). In each time interval, six subcarriers form a CDMA slot of length R.

From the perspective of a CDMA slot, conventionally, each BS scrambles information symbols with a pseudo-random Noise (PN) sequence, i.e. a scrambling sequence in each CDMA slot. On the other hand, in the present invention, each BS is allocated an orthogonal or quasi-orthogonal code of a length equal to the repetition number R and spreads information symbols with the orthogonal or quasi-orthogonal code, for transmission in each CDMA slot. Herein, it is said that orthogonal codes have orthogonality and quasi-orthogonal codes have quasi-orthogonality. The quasi-orthogonal codes are defined as codes having the least correlation between them, for a predetermined number of codes and a predetermined code length.

Referring to FIG. 6, the vertical axis represents the time domain and the vertical axis represents the frequency domain. Information symbols s(0), s(1) and s(2) occur six times on the time domain as they each are multiplied by a spreading code of length 6 oc(r)={oc(0), oc(1), oc(2), oc(3), oc(4), oc(5)}. Six time intervals t=0, Ts, . . . , 5 Ts form a CDMA slot on each subcarrier.

When a channel varies little within the CDMA slot having the above configuration, an MT can effectively eliminate neighboring cell signal components by despreading a received signal with the orthogonal code of its serving BS. The receiver of the MT has almost the same configuration as shown in FIG. 2 and thus its detailed description is not provided herein.

Figure 1:
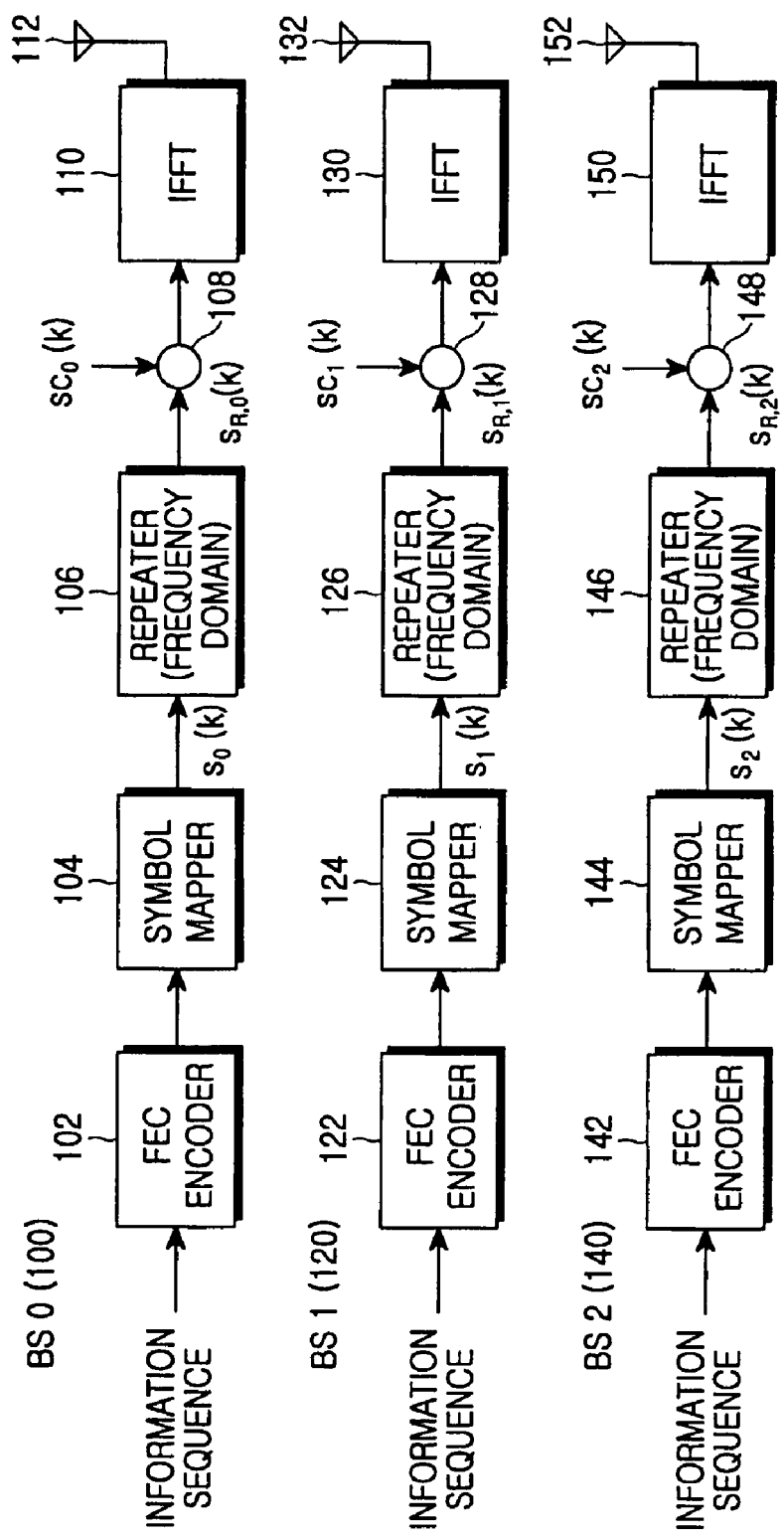
FIG. 1 is a block diagram of a typical OFDMA transmission structure.
Figure 2:
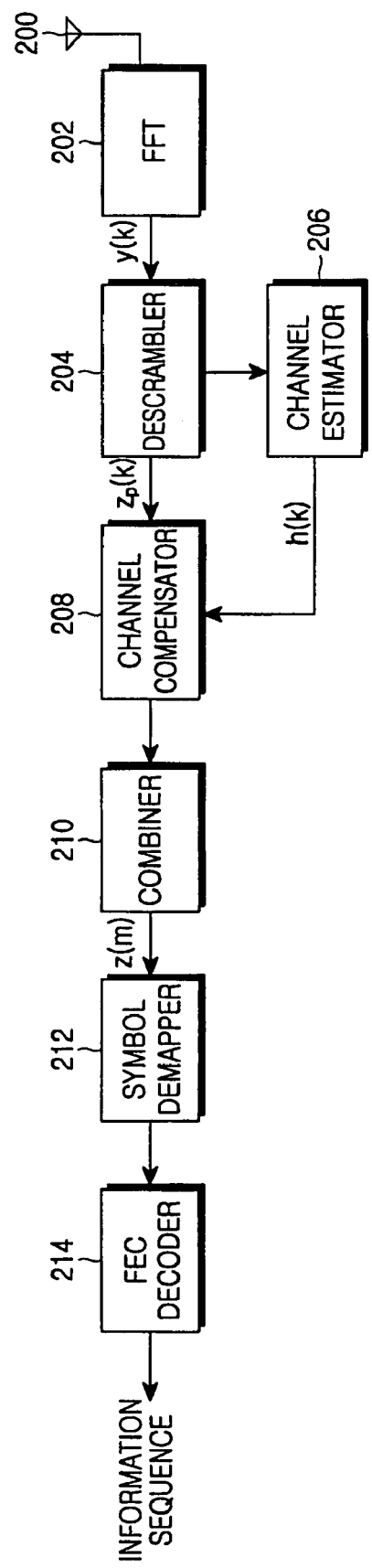
FIG. 2 is a block diagram of a typical OFDMA receiver.
Figure 3:
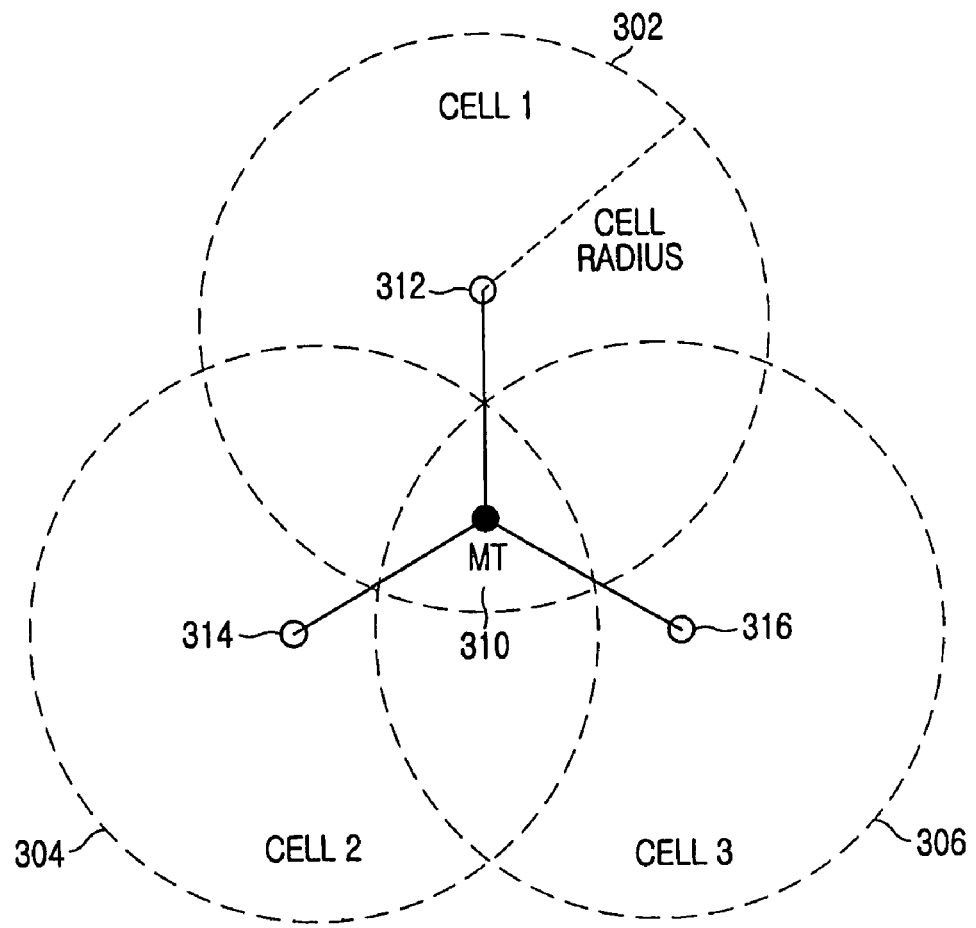
FIG. 3 illustrates a typical MT located in an overlap region among the cells of three BSs.

The MT receiver of the present invention differs in operation from the receiver illustrated in FIG. 2 in that the descrambler is replaced with a despreader that receives the BS-specific orthogonal code of the serving cell and information describing a CDMA slot structure from a higher-layer system or the BS and eliminates neighbor cell interference signals by despreading a signal received in a CDMA slot with the orthogonal code. Another difference is that a combiner accumulates the despread data as many times as a predetermined repetition number R.

A preferred embodiment of the present invention will be described referring to equations. It is assumed herein that a serving cell is BS0 (i=0) and one interfering neighboring BS BS1 (i=1) exists. An OFDM frame is so configured that information symbols are repeated over R subcarriers in the frequency domain, as illustrated in FIG. 5. That is, a CDMA slot is formed with R subcarriers in each time interval.

In accordance with the preferred embodiment of the present invention, instead of a scrambling sequence of period N used in the conventional technology, a spreading code of length R is allocated to a time-frequency resource block, i.e. a CDMA slot in which an information symbol is repeated. The time-frequency resource block is commonly allocated to the same logical channel in a plurality of BSs. The spreading code is an orthogonal code given as Equation (10), $$\sum_{r=0}^{R-1} oc_0(r)oc_1(r) = 0 \tag{10}$$

where $oc_0(r)$ denotes an orthogonal code allocated to BS0, $oc_1(r)$ denotes an orthogonal code allocated to BS1, R denotes a repetition number (the length of a repeated area), the length of a CDMA slot, or the length of the orthogonal code. If R is an exponent of 2, for example, R=2, 4, or 8, the orthogonal codes are preferably Walsh codes. This property is different from that of scrambling sequences being PN sequences, expressed as $$\sum_{r=0}^{R-1} sc_0(r)sc_1(r) \neq 0.$$

For R=6 and one neighbor BS, $oc_0(r)=\{1, 1, 1, 1, 1, 1\}$ and $oc_1(r)=\{1, -1, 1, -1, 1, -1\}$, for example. As the orthogonal codes are used in each CDMA slot, signals from the BSs are orthogonal to each other in the CDMA slot.

Meanwhile, the receiver eliminates the repetition effect through the despreader and the combiner. The resulting signal z(m) is expressed by Equation (11) as, $$z(m)=s_0(m)+I(m) \tag{11}$$

The interference and noise I(m) is given by Equation (12), $$I(m) = \frac{1}{R}\sum_{r=0}^{R-1}(oc_1(r)h_1(r+mR)s_{R,1}(r+mR) + n(r+mR))oc_0(r)/h_0(r+mR) \quad (12)$$

When the length of the repeated area R is relatively small, the channel changes less within the repeated area. Therefore, the channel frequency characteristics $h_0$ and $h_1$ of BS0 and BS1 are approximated by Equation (13), $$h_0(mR) \approx h_0(mR+1) \approx \ldots \approx h_0(mR+R-1)$$
$$h_1(mR) \approx h_1(mR+1) \approx \ldots \approx h_1(mR+R-1) \quad (13)$$

Hence, I(m) is approximated by Equation (14), $$I(m) = a(m)\frac{1}{R}\sum_{r=0}^{R-1}oc_1(r)oc_0(r) + \frac{1}{R}\sum_{r=0}^{R-1}n(r+mR)oc_0(r)/h_0(r+mR) \quad (14)$$

$$a(m) = s_1(m)h_1(mR)/h_0(mR)$$

Owing to the orthogonality represented as equation (10), neighboring cell interference signals are entirely cancelled. Thus, a final noise signal is given by Equation (15), $$I(m) = \frac{1}{R}\sum_{r=0}^{R-1}n(r+mR)oc_0(r+mR)/h_0(r+mR) \quad (15)$$

Figure 7:
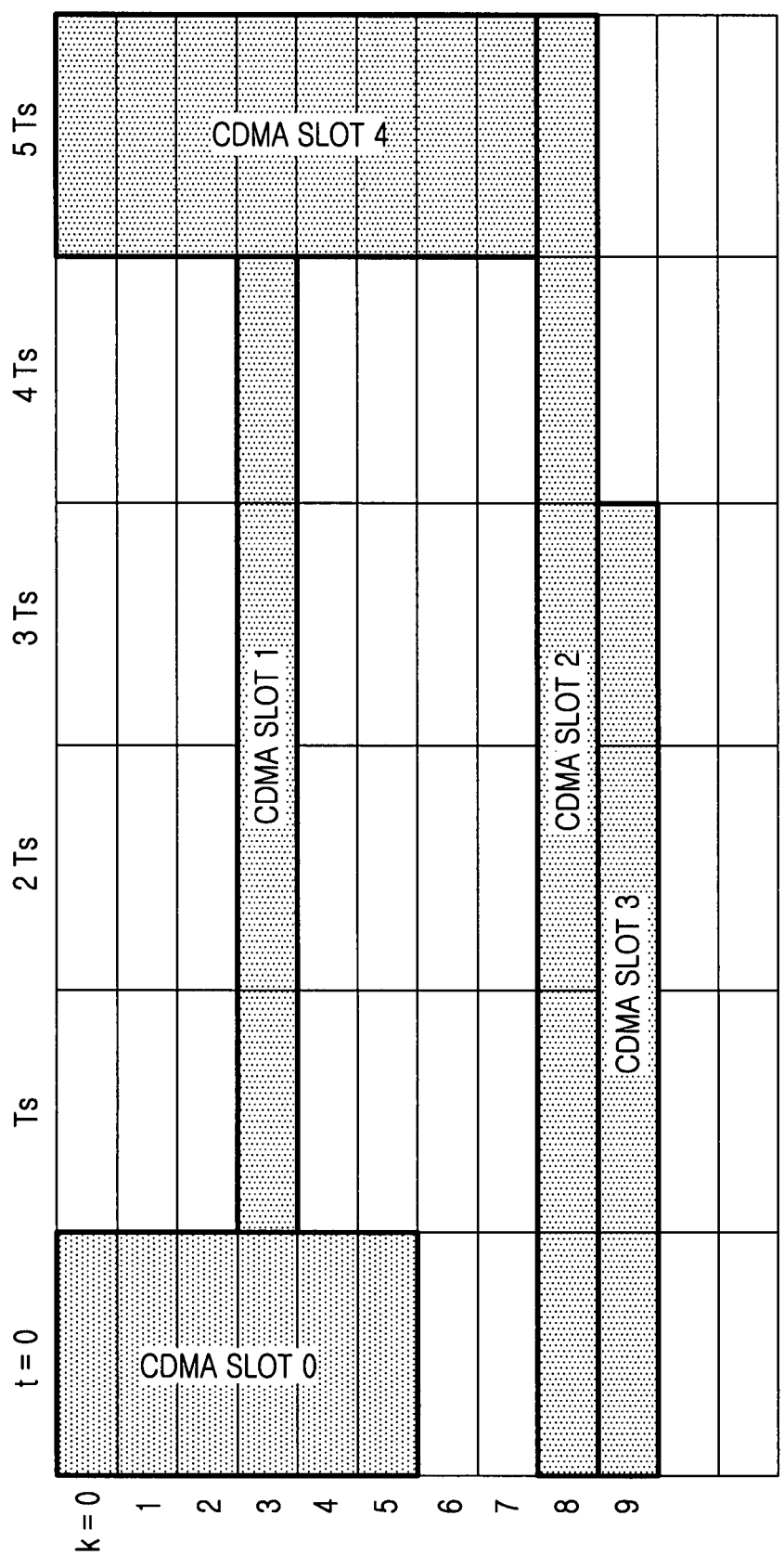
FIG. 7 illustrates a variable CDMA slot structure according to the present invention.

As stated before, the size and configuration of the CD slot can be changed by changing the repetition number R and modifying the orthogonal codes. Referring to FIG. 7, in an OFDMA frame defined by a plurality of subcarriers and a plurality of time intervals, CDMA slot 0 is composed of six subcarriers (k=0 to 5) in a time interval t=0, CDMA slot 1 is composed of four time intervals (t=Ts to 4 Ts) on a subcarrier k=3, CDMA slot 2 is composed of total time intervals (t=0 to 5 Ts) on a subcarrier k=8, CDMA slot 3 is composed of four time intervals (t=0 to 3 Ts) on a subcarrier k=9, and CDMA slot 4 is composed of eight subcarriers (k=0 to 7) in a time interval t=5 Ts.

In this way, CDMA slots of different sizes and different resource positions can be allocated to an OFDMA frame. Orthogonal codes are set for each of the CDMA slots and allocated to BSs for use in the CDMA slot. Thus, various orthogonal codes can be applied to the CDMA slots.

The transmission technique of the present invention for a WiBro system was simulated under the conditions that the total number of available subcarriers N is 1024, a frequency reuse factor $N_{used}$ is 864, a repetition number R is 6, repetition occurs only on the frequency domain, and two neighboring BSs exist in addition to a serving BS. The following orthogonal codes were used, for example:

$$oc_0(k) = \{1,1,1,1,1,1\}$$
$$oc_1(k) = \{1,-1,1,-1,1,-1\}$$
$$oc_2(k) = \{1,1,-1,-1,1,-1\}$$

A flat fading channel environment and a pedestrian B channel environment with a background noise level of −20 dB are assumed.

Figure 8:
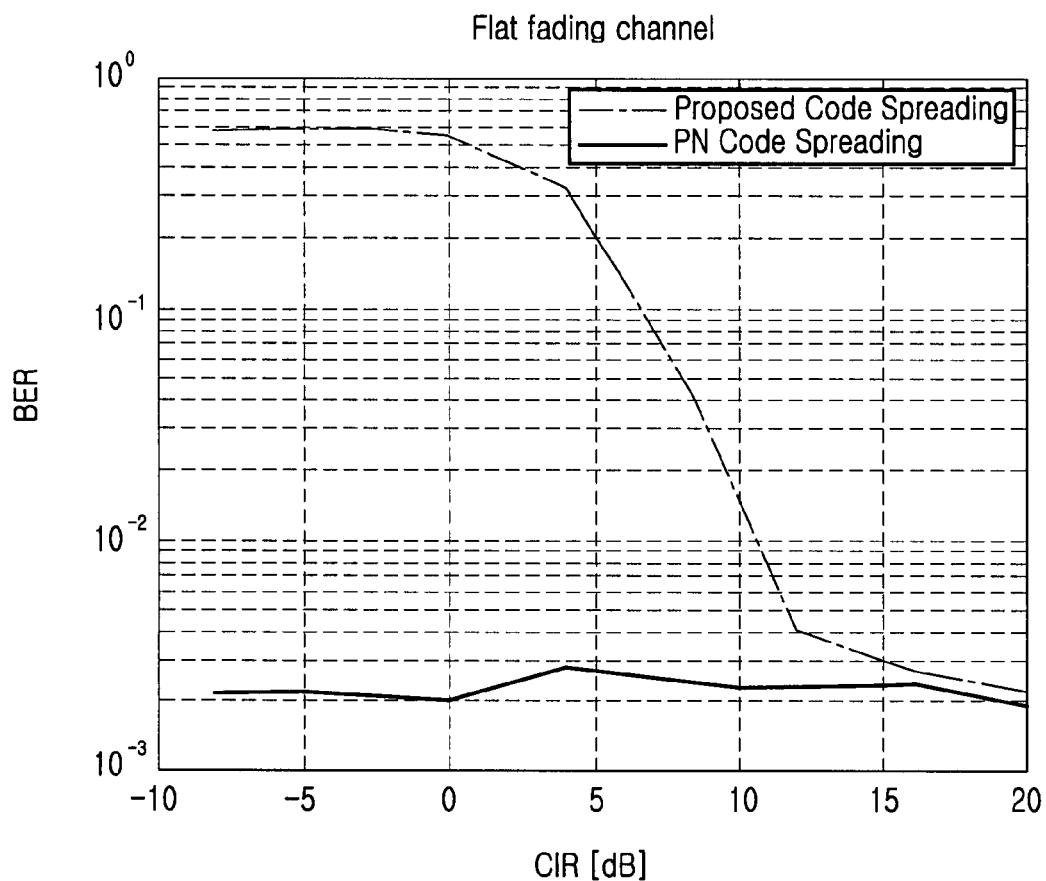
FIGS. 8 and 9 are graphs illustrating results of a simulation comparing the present invention with a conventional technology in terms of reception performance.
Figure 9:
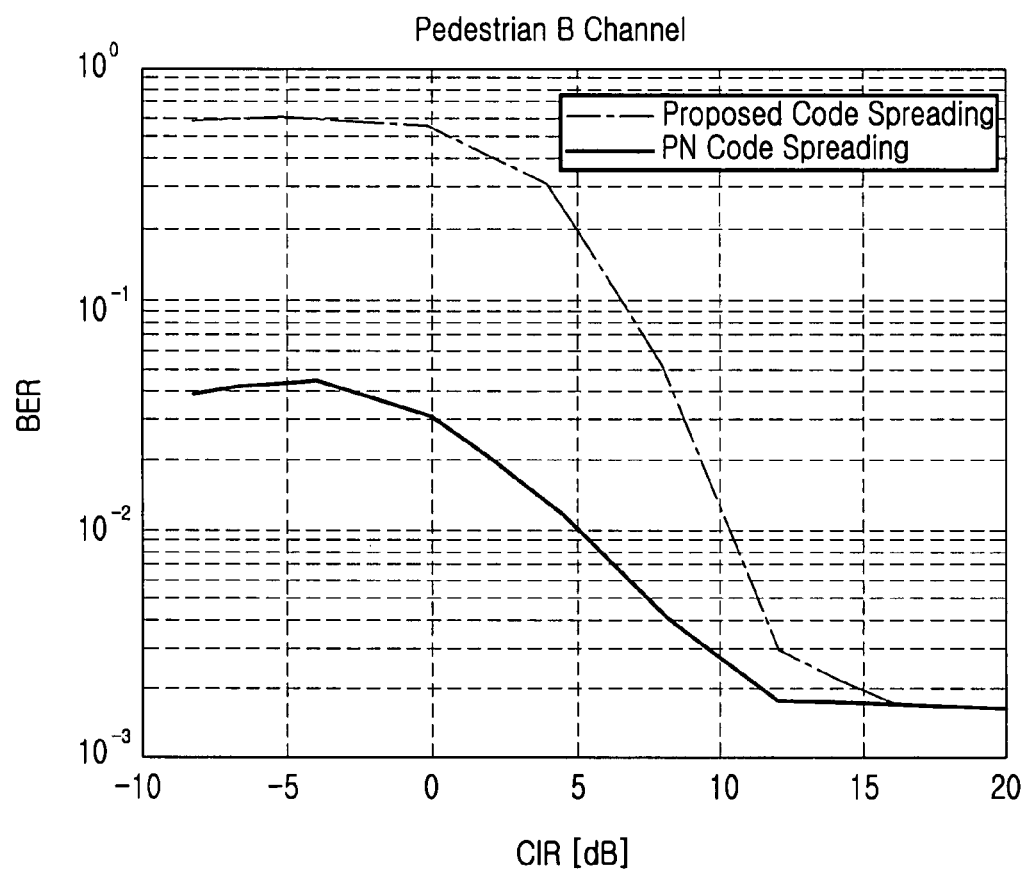

The results of the simulation in the above channel environment are illustrated in FIGS. 8 and 9.

FIG. 8 is a graph comparing use of orthogonal codes according to the present invention (Proposed Code Spreading) with conventional use of scrambling sequences (PN Code Spreading) under the flat fading channel environment, in terms of Bite Error rate (BER) versus Channel Impulse Response (CIR). As noted from the graph, since the two cases demonstrate the same channel characteristics over successive subcarriers with R=6 in the flat channel environment, code orthogonality (or low correlation coefficient) is maintained between the BSs. Therefore, interference from the two neighboring BSs is considerably reduced.

FIG. 9 is a graph comparing Proposed Code Spreading with PN Code Spreading under the pedestrian B channel environment, i.e. the frequency-selective channel environment in terms of BER versus CIR.

Referring to FIG. 9, the channel changes within a single CDMA slot, which changes the correlation property between orthogonal codes. Despite the resulting imperfect cancellation of other cell interference, Proposed Code Spreading outperforms PN Code Spreading by an about 5 dB gain at BER=10e−2.

As described above, the present invention advantageously increases the reception performance of an MT located at a cell boundary between BSs and further increases handover performance by canceling other cell interference in an OFDMA system. Specifically, a repeated area of an information symbol is defined as a CDMA slot and orthogonal codes or less-correlated codes are allocated to each CDMA slot, for spreading information symbols. Therefore, other cell interference is considerably reduced.

While the invention has been shown and described with reference to certain preferred embodiments of the present invention thereof, it will be understood by those skilled in the art that various changes in form and details may be made therein without departing from the spirit and scope of the present invention as further defined by the appended claims and their equivalents.

What is claimed is:

1. A transmission method for reducing other cell interference in a wireless communication system, comprising:
    generating, at a Base Station (BS), at least one modulation symbol to be transmitted;
    repeating, mapping, and assigning the modulation symbol, at the BS, into a resource block common to the BS and at least one neighboring BS, the at least one neighboring BS being substantially adjacent to the BS, and the resource block comprising a plurality of subcarriers or a plurality of time intervals, wherein the modulation symbol is repeated according to repetition number R such that the modulation symbol can be assigned to each of the plurality of subcarriers or each of the plurality of time intervals; and
    spreading the mapped modulation symbol, at the BS, with a BS-specific code allocated to the BS, the BS-specific codes of the BS being one of orthogonal and quasi-orthogonal to a BS-specific code allocated to the neighbor BS.

2. The transmission method of claim 1, further comprising;
    processing the spread data by Inverse Fast Fourier Transform (IFFT) and transmitting the IFFT signal to a user terminal by the BS.

3. The transmission method of claim 1, wherein the modulation symbol is repeated before the mapping into the resource block.

4. The transmission method of claim 1, wherein the repetition number R comprises a number of the plurality of subcarriers or a number of the plurality of time intervals.

5. The transmission method of claim 4, wherein the repetition number R is a predetermined repetition number and the number R is variable.

6. The transmission method of claim 5, wherein the repetition number R is an exponent of 2.

7. The transmission method of claim 1, wherein the plurality of subcarriers comprises a plurality of subcarriers in a time interval and the plurality of time intervals comprises a plurality of time intervals on a subcarrier in an OFDMA frame.

8. The transmission method of claim 1, wherein the resource block is commonly allocated to the same logical channel of the BS and the neighboring BS.

9. A transmitter of a Base Station (BS) for reducing other cell interference in a wireless communication system, comprising:
   a symbol generator for generating at least one modulation symbol to be transmitted;
   a resource mapper for repeating, mapping and assigning the modulation symbol into a resource block common to the BS and at least one neighboring BS, wherein the modulation symbol is repeated according to repetition number R and the repeated modulation symbol is assigned to least one of R time intervals or R subcarriers in a frame; and
   a spreader for spreading the mapped modulation symbol with a BS-specific code allocated to the BS, the BS-specific codes of the BS being one of orthogonal and quasi-orthogonal to a BS-specific code allocated to the neighbor BS.

10. The transmitter of claim 9, further comprising:
   a IFFT processor for processing the spread data by Inverse Fast Fourier Transform (IFFT) and transmitting the IFFT signal to a user terminal by the BS.

11. The transmitter of claim 9, wherein the resource mapper performs the repeating prior to the mapping.

12. The transmitter of claim 11, wherein the frame comprises an OFDMA frame.

13. The transmitter of claim 12, wherein the repetition number R is a predetermined repetition number and the number R is variable.

14. The transmitter of claim 13, wherein the repetition number R is an exponent of 2.

15. The transmitter of claim 9, wherein the time-frequency resource block is defined by at least one of a plurality of subcarriers in a time interval and a plurality of time intervals on a subcarrier in an OFDMA frame.

16. The transmission method of claim 9, wherein the resource block is commonly allocated to the same logical channel of the BS and the neighboring BS.

17. A receiving method for reducing other cell interference in a wireless communication system, comprising:
   receiving, at a Mobile Terminal (MT), a spread data through a resource block common to a Base Station (BS) and at least one neighboring BS, the resource block comprising a plurality of subcarriers or a plurality of time intervals, wherein a modulation symbol is repeated in the resource block according to repetition number R such that each of the plurality of subcarriers or each of the plurality of time intervals comprises the modulation symbol;
   despreading the spread data, at the MT, with a BS-specific code allocated to the BS and outputting at least one modulation symbol, the BS-specific codes of the BS being one of orthogonal and quasi-orthogonal to a BS-specific code allocated to the neighbor BS; and
   decoding the modulation symbol at the MT.

18. The receiving method of claim 17, wherein the plurality of subcarriers comprises a plurality of subcarriers in a time interval and the plurality of time intervals comprises a plurality of time intervals on a subcarrier in an OFDMA frame.

19. The receiving method of claim 17, wherein the resource block is commonly allocated to the same logical channel of the BS and the neighboring BS.

20. The receiving method of claim 17, wherein the resource block is a time-frequency resource block.

21. A transmission system for reducing other cell interference in a wireless communication system, comprising:
   means for generating, at a Base Station (BS), at least one modulation symbol to be transmitted;
   means for repeating, mapping, and assigning the modulation symbol, at the BS, into a resource block common to the BS and at least one neighboring BS, the resource block comprising a plurality of subcarriers in a time interval or a plurality of time intervals on a subcarrier, wherein the modulation symbol is repeated according to repetition number R such that the modulation symbol can be assigned to each of the plurality of subcarriers or each of the plurality of time intervals; and
   means for spreading the mapped modulation symbol, at the BS, with a BS-specific code allocated to the BS, the BS-specific codes of the BS being one of orthogonal and quasi-orthogonal to a BS-specific code allocated to the neighbor BS.

22. A processor that executes instructions for a wireless communication system, the instructions comprising:
   generating, at a Base Station (BS), at least one modulation symbol to be transmitted;
   repeating, mapping, and assigning the modulation symbol, at the BS, into a resource block common to the BS and at least one neighboring BS, the resource block comprising at least one of a plurality of subcarriers or a plurality of time intervals, wherein the modulation symbol is repeated according to repetition number R such that the modulation symbol can be assigned to at least one of each of the plurality of subcarriers or each of the plurality of time intervals; and
   spreading the mapped modulation symbol, at the BS, with a BS-specific code allocated to the BS, the BS-specific codes of the BS being one of orthogonal and quasi-orthogonal to a BS-specific code allocated to the neighbor BS.

* * * * *